United States Patent
Clemens et al.

(10) Patent No.: US 11,606,546 B1
(45) Date of Patent: Mar. 14, 2023

(54) PERSPECTIVE BASED GREEN SCREENING

(71) Applicant: Tanzle, Inc., Scotts Valley, CA (US)

(72) Inventors: Nancy L. Clemens, Scotts Valley, CA (US); Michael A. Vesely, Scotts Valley, CA (US)

(73) Assignee: Tanzle, Inc., Scotts Valley, CA (US)

( * ) Notice: Subject to any disclaimer, the term of this patent is extended or adjusted under 35 U.S.C. 154(b) by 0 days.

(21) Appl. No.: 17/592,472

(22) Filed: Feb. 3, 2022

Related U.S. Application Data

(63) Continuation of application No. 16/679,093, filed on Nov. 8, 2019, now Pat. No. 11,245,889.

(60) Provisional application No. 62/757,604, filed on Nov. 8, 2018.

(51) Int. Cl.
*H04N 13/156* (2018.01)
*G06T 19/00* (2011.01)
*H04N 9/75* (2006.01)
*G06T 7/70* (2017.01)
*G06T 7/90* (2017.01)

(52) U.S. Cl.
CPC ............ *H04N 13/156* (2018.05); *G06T 7/70* (2017.01); *G06T 7/90* (2017.01); *G06T 19/006* (2013.01); *H04N 9/75* (2013.01); *G06T 2207/10021* (2013.01)

(58) Field of Classification Search
None
See application file for complete search history.

(56) References Cited

U.S. PATENT DOCUMENTS

| | | | |
|---|---|---|---|
| 9,266,017 B1 | 2/2016 | Parker et al. | |
| 10,665,020 B2 | 5/2020 | Gribetz et al. | |
| 2007/0291035 A1 | 12/2007 | Vesely et al. | |
| 2011/0249090 A1 | 10/2011 | Moore et al. | |
| 2012/0200667 A1* | 8/2012 | Gay | H04N 5/272 348/43 |
| 2012/0206452 A1 | 8/2012 | Geisner et al. | |
| 2013/0100132 A1 | 4/2013 | Katayama et al. | |
| 2013/0182225 A1 | 7/2013 | Stout | |
| 2014/0118506 A1 | 5/2014 | Uhl | |
| 2014/0306995 A1 | 10/2014 | Raheman et al. | |
| 2015/0054823 A1 | 2/2015 | Dzhurinskiy et al. | |

(Continued)

OTHER PUBLICATIONS

Spindler et al., "Use your head: Tangible windows for 3D information spaces in a tabletop environment," ITS '12: Proceedings of the 2012 ACM International Conference on Interactive Tabletops and Surfaces, Nov. 2012, 245-254.

(Continued)

*Primary Examiner* — Anh-Tuan V Nguyen
(74) *Attorney, Agent, or Firm* — Fish & Richardson P.C.

(57) ABSTRACT

A method of generating a composite image includes capturing a video image of a physical scene with a camera, identifying a green-screen region within the video image, identifying a viewpoint and a position and/or orientation of the green-screen region relative to the viewpoint, and generating a modified video image rendered from the viewpoint onto a display surface in which the green-screen region is replaced with an image of a virtual object. The image of the virtual object is generated by projection rendering of a model of the virtual object based on the position and/or orientation of the green-screen region relative to the viewpoint such that the virtual object is constrained within the green-screen region.

21 Claims, 7 Drawing Sheets

(56) References Cited

U.S. PATENT DOCUMENTS

| | | |
|---|---|---|
| 2015/0077592 A1 | 3/2015 | Fahey |
| 2015/0260505 A1 | 9/2015 | Nagano et al. |
| 2015/0312561 A1 | 10/2015 | Hoof et al. |
| 2015/0348326 A1 | 12/2015 | Sanders et al. |
| 2016/0133057 A1* | 5/2016 | Kaino ................ G06T 7/70 345/633 |
| 2017/0228928 A1 | 8/2017 | Terahata |
| 2018/0205940 A1 | 7/2018 | Donovan |
| 2019/0102949 A1 | 4/2019 | Sheftel et al. |
| 2019/0281194 A1 | 9/2019 | Mine et al. |
| 2019/0304166 A1 | 10/2019 | Yu et al. |
| 2020/0065991 A1 | 2/2020 | Chu et al. |
| 2020/0242842 A1 | 7/2020 | Fukazawa et al. |
| 2020/0252593 A1* | 8/2020 | Chapdelaine-Couture ............... H04N 5/265 |

OTHER PUBLICATIONS

Lu et al., *A Survey of Motion-Parallax-Based 3-D Reconstruction Algorithms*, IEEE Transactions on Systems, Man, and Cybernetics—Part C: Applications and Review, 2004, 34(4):532-548.

* cited by examiner

PERSPECTIVE BASED GREEN SCREENING

CROSS-REFERENCE TO RELATED APPLICATIONS

This is a continuation of U.S. application Ser. No. 16/679,093, filed on Nov. 8, 2019, which claims priority to U.S. Provisional Application No. 62/757,604, filed on Nov. 8, 2018. The disclosures of the prior applications are considered part of and are incorporated by reference in the disclosure of this application.

BACKGROUND

Technical Field

This disclosure relates to a three-dimensional display system, and in particular, to a display process to render virtual objects in a visualized three dimensional space reflecting the data presented to the rendering system.

Description of Related Art

Three dimensional (3D) capable electronics and computing hardware devices and real-time computer-generated 3D computer graphics have been a popular area of computer science for the past few decades, with innovations in visual, audio, tactile and biofeedback systems. Much of the research in this area has produced hardware and software products that are specifically designed to generate greater realism and more natural computer-human interfaces. These innovations have significantly enhanced and simplified the end-user's computing experience.

Ever since humans began to communicate through pictures, they faced a dilemma of how to accurately represent the three-dimensional world they lived in. Sculpture was used to successfully depict three-dimensional objects, but was not adequate to communicate spatial relationships between objects and within environments. To do this, early humans attempted to "flatten" what they saw around them onto two-dimensional, vertical planes (e.g., paintings, drawings, tapestries, etc.).

The two dimensional pictures must provide a numbers of cues of the third dimension to the brain to create the illusion of three dimensional images. This effect of third dimension cues can be realistically achievable due to the fact that the brain is quite accustomed to it. The three dimensional real world is always and already converted into two dimensional (e.g., height and width) projected image at the retina, a concave surface at the back of the eye. And from this two dimensional image, the brain, through experience and perception, generates the depth information to form the three dimension visual image from two types of depth cues: monocular (one eye perception) and binocular (two eye perception). In general, binocular depth cues are innate and biological while monocular depth cues are learned and environmental.

A planar stereoscopic display, e.g., a LCD-based or a projection-based display, shows two images with disparity between them on the same planar surface. By temporal and/or spatial multiplexing the stereoscopic images, the display results in the left eye seeing one of the stereoscopic images and the right eye seeing the other one of the stereoscopic images. It is the disparity of the two images that results in viewers feeling that they are viewing three dimensional scenes with depth information.

SUMMARY

In one aspect, a method of generating a composite image includes capturing a video image of a physical scene with a camera, identifying a green-screen region within the video image, identifying a viewpoint and a position and/or orientation of the green-screen region relative to the viewpoint, and generating a modified video image rendered from the viewpoint onto a display surface in which the green-screen region is replaced with an image of a virtual object. The image of the virtual object is generated by projection rendering of a model of the virtual object based on the position and/or orientation of the green-screen region relative to the viewpoint such that the virtual object is constrained within the green-screen region.

In other aspects, a computer program product or system is configured to perform the method.

Implementations may include one or more of the following features.

The video image is stereoscopic. The green-screen region may be a surface within the stereoscopic image. The green-screen region may be a volume within the stereoscopic image.

Identifying the green-screen region may include converting the image to a 3D model of the physical scene. Identifying the green-screen region may include detecting a color in the image. Identifying the green-screen region may include detecting a shape in the image. Identifying the green-screen region may include data representing a three-dimensional shape, receiving a signal indicating a position of an object within the physical scene, and selecting a region corresponding to the three-dimensional shape placed at the position.

BRIEF DESCRIPTION OF THE DRAWINGS

A better understanding of the present disclosure can be obtained when the following detailed description of the preferred embodiment is considered in conjunction with the following drawings, in which.

DETAILED DESCRIPTION

Figure 1:
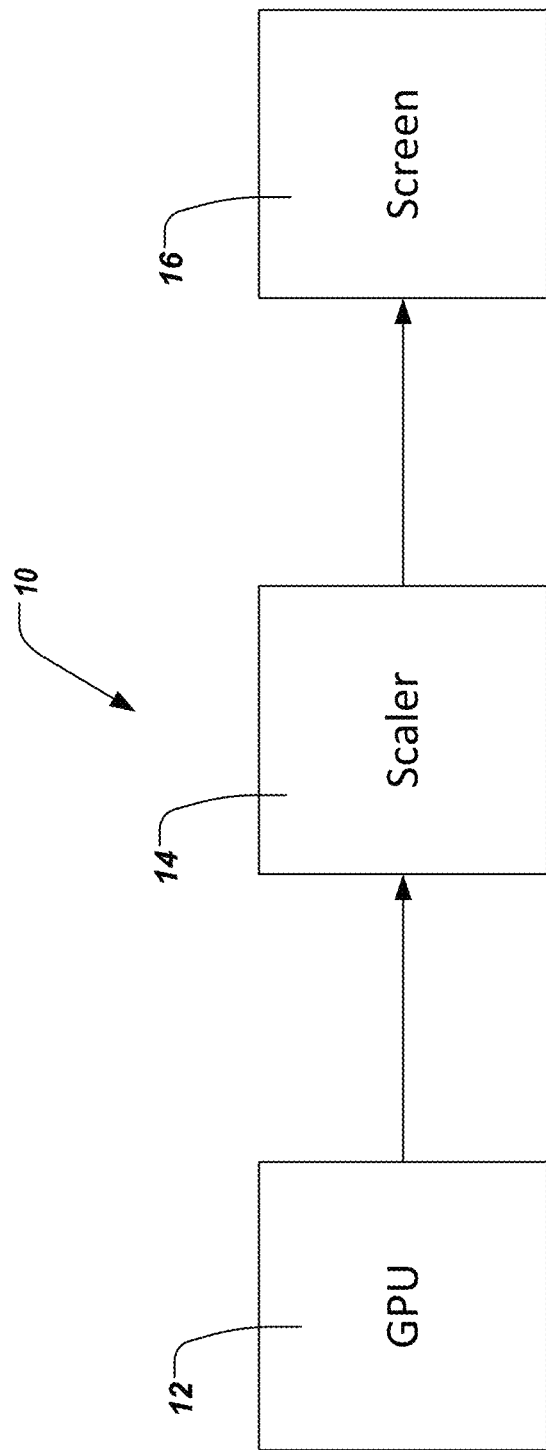
FIG. 1 presents a prior art display chain.

FIG. 1 illustrates a typical conventional display chain 10, which includes the following components:

1. Graphics Processing Unit (GPU). The GPU 12 typically resides on a personal computer, workstation, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

2. Scaler. The scaler 14 is a video processor that converts video signals from one display resolution to another. This component takes as input the video levels (e.g., for R, G, and B) for each pixel output from the GPU, and processes them in various ways, before outputting (usually) modified video levels for RGB in a format suitable for the panel, usually in the same 8-bit range of 0-255. The conversion can be a scaling transformation, but can also possibly include a rotation or other linear or non-linear transformation. The transformation can also be based on a bias of some statistical or other influence. The scaler 14 can be a component of a graphics card in the personal computer, workstation, etc.

3. Panel. The panel 16 is the display screen itself. In some implementations, the panel 16 can be a liquid crystal display (LCD) screen. In some other implementations, the panel 16 can be a component of eyewear that a user can wear. Other display screens are possible.

Time Sequential Stereo Displays

Unlike a normal display, in a stereo display, there are two images—right and left. The right image is to be delivered to only the right eye, and the left image is to be delivered to only the left eye. In a time sequential stereo display, this separation of right and left images is performed in time, and thus, it must contain some time-dependent element which separates these two images. There are two common architectures.

Figure 2:
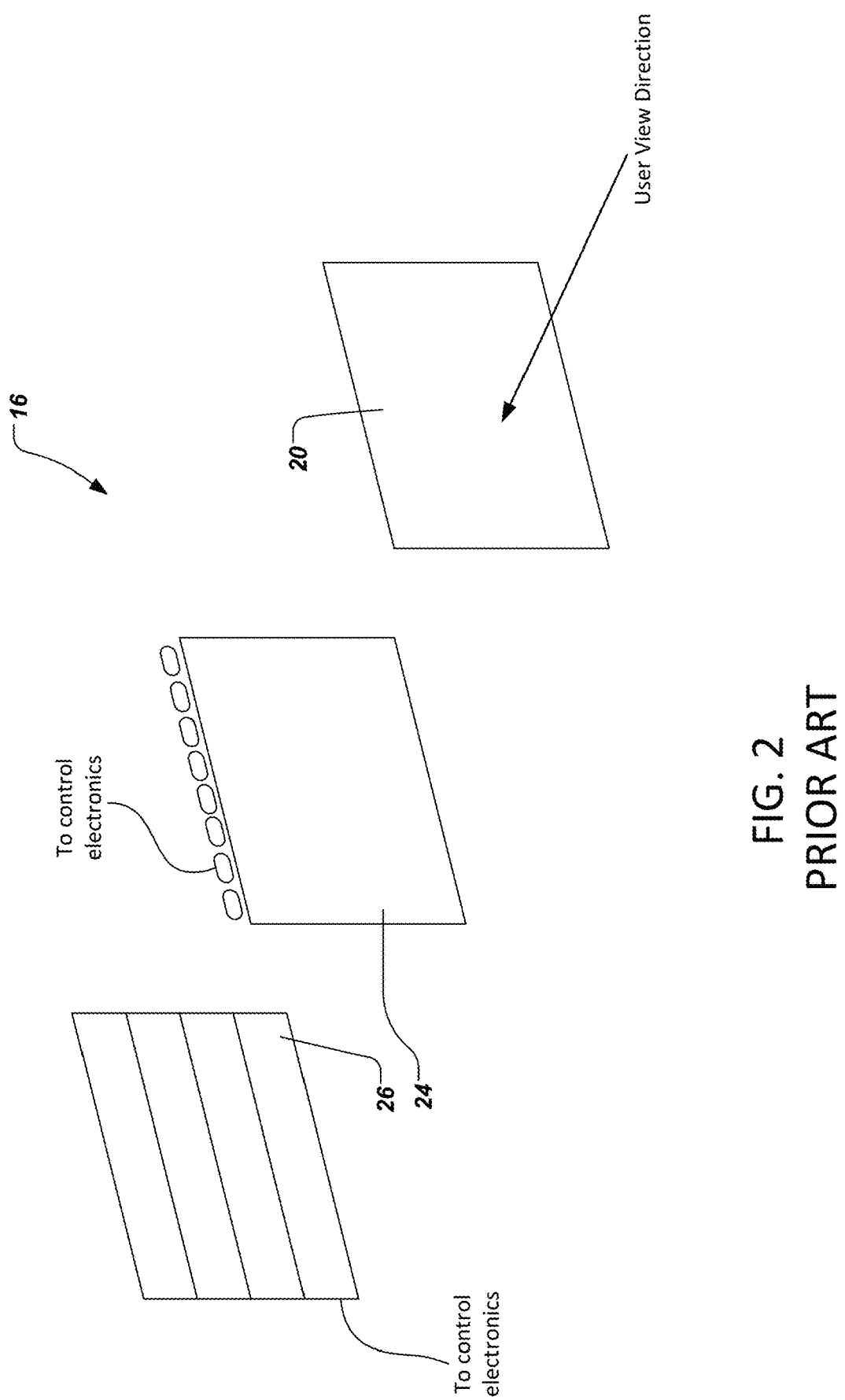
FIG. 2 presents a prior art polarization switch architecture.

The first architecture, shown in FIG. 2, uses a device called a polarization switch (PS) 20 which may be a distinct (separate) or integrated LC device or other technology switch. The polarization switch 20 is placed in front of the display panel 24, specifically between the display panel 24 and the viewer. The display panel 24 can be an LCD panel which can be backlit by a backlight unit 26, or any other type of imaging panel, e.g., an organic light emitting diode (OLED) panel, a plasma display, etc., or any other pixelated panel display used in a time-sequential stereo imaging system. The purpose of the polarization switch 20 is to switch the light between two orthogonal polarization states. For example, one of these states may be horizontally linearly polarized light (horizontal linear polarization state), and the other may be vertically linearly polarized light (vertical linear polarization state); however, other options are possible, e.g., left and right circular polarization states, etc., the key feature being that the two polarization states are orthogonal.

Figure 3:
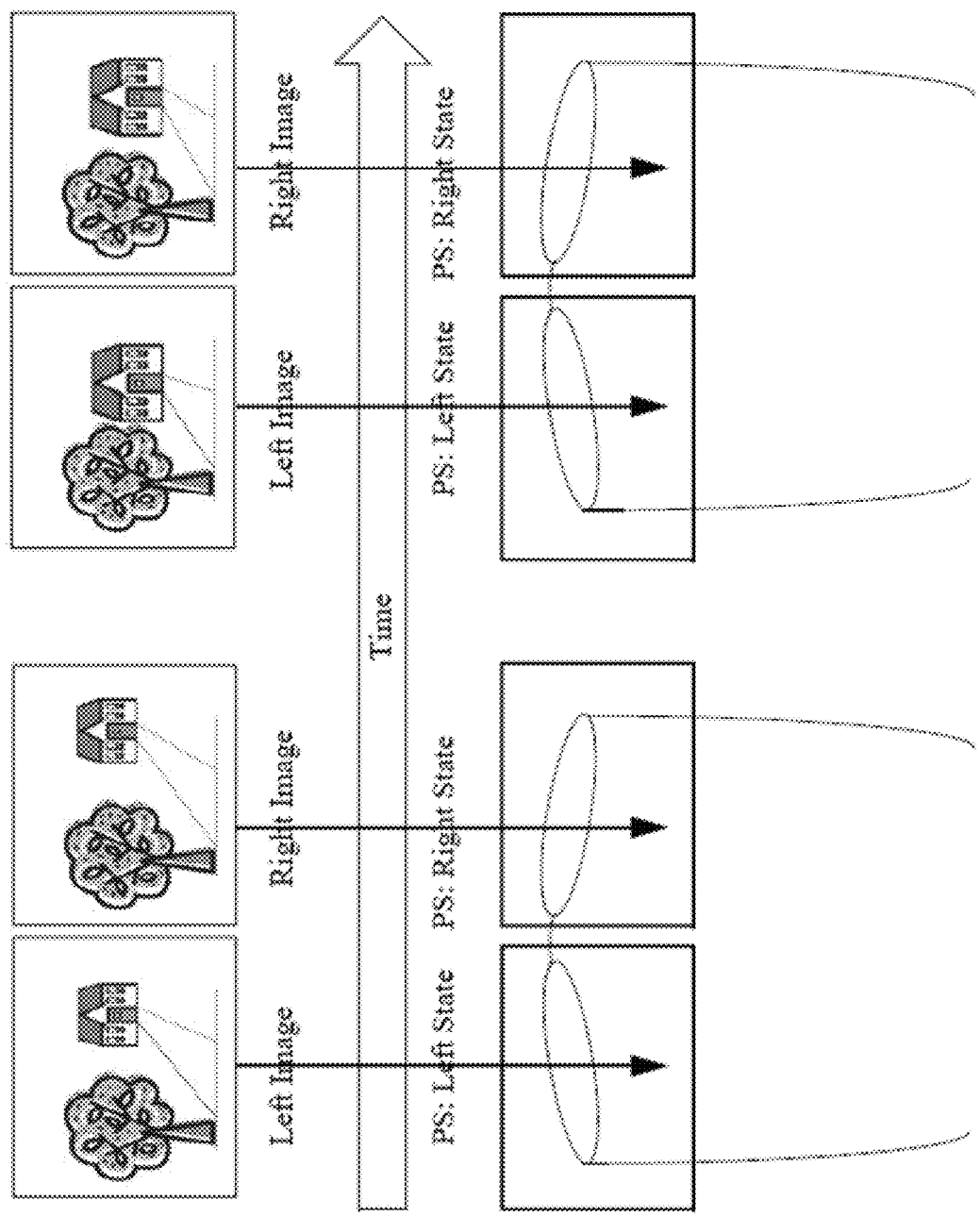
FIG. 3 presents prior art left and right switching views causing a stereo 3D effect.

This allows achievement of the stereo effect shown in FIG. 3. As may be seen, the top portion of the figure shows the (display) panel switching between a left image and a right image. Synchronous with this, the PS is switching between a Left State and a Right State. These states emit two orthogonal polarization states, as mentioned above. The stereo eyewear is designed such that the left lens will only pass the Left State polarization and the right lens will only pass the Right State polarization. In this way, separation of the right and left images is achieved.

The second conventional architecture uses stereo shutter glasses, which replace the PS and eyewear. In this system, each eye is covered by an optical shutter, which can be either open or closed. Each of these shutters is opened and closed synchronously with the panel display in such a way that when the left image is shown on the display, only the left eye shutter is open, and when the right image is shown on the display, only the right eye shutter is open. In this manner, the left and right views are presented to the user's left and right eyes, respectively.

Prior Art Green Screening

Green screening, also called "chroma key compositing" or "chroma keying," is a visual effects technique for compositing two images or video streams together based on a specified color hue. A color range in a foreground image is made transparent, allowing a background image to be inserted into the scene depicted by the foreground footage.

Chroma keying can be performed with backgrounds of any color that are uniform and distinct, but green and blue backgrounds are more commonly used because they differ most distinctly in hue from most human skin colors. If the subject being filmed or photographed has the same color as the color being used for the chroma keying, then the subject will be made transparent and lost.

In some implementations, the chroma-keyed area can outline a region in the camera frame that is not the same color. Then, the chroma-keyed area and the region in the camera frame that the chroma-keyed area outlines are both rendered as transparent.

Figure 4B:
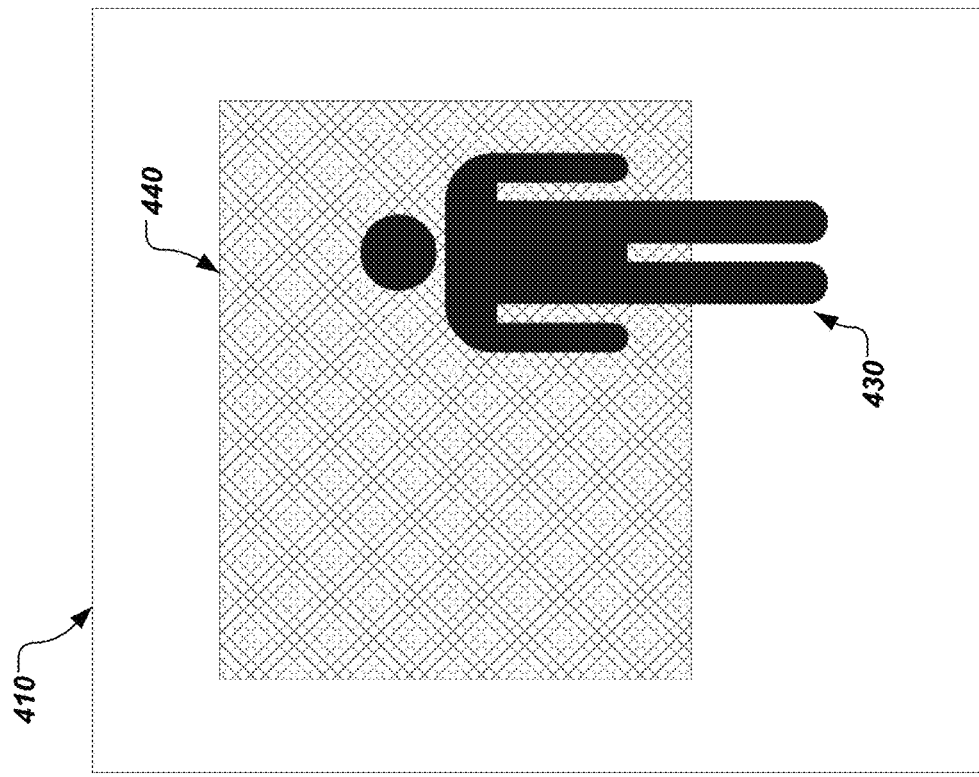
FIG. 4B presents a prior art green screen system after green-screen processing.
Figure 4A:
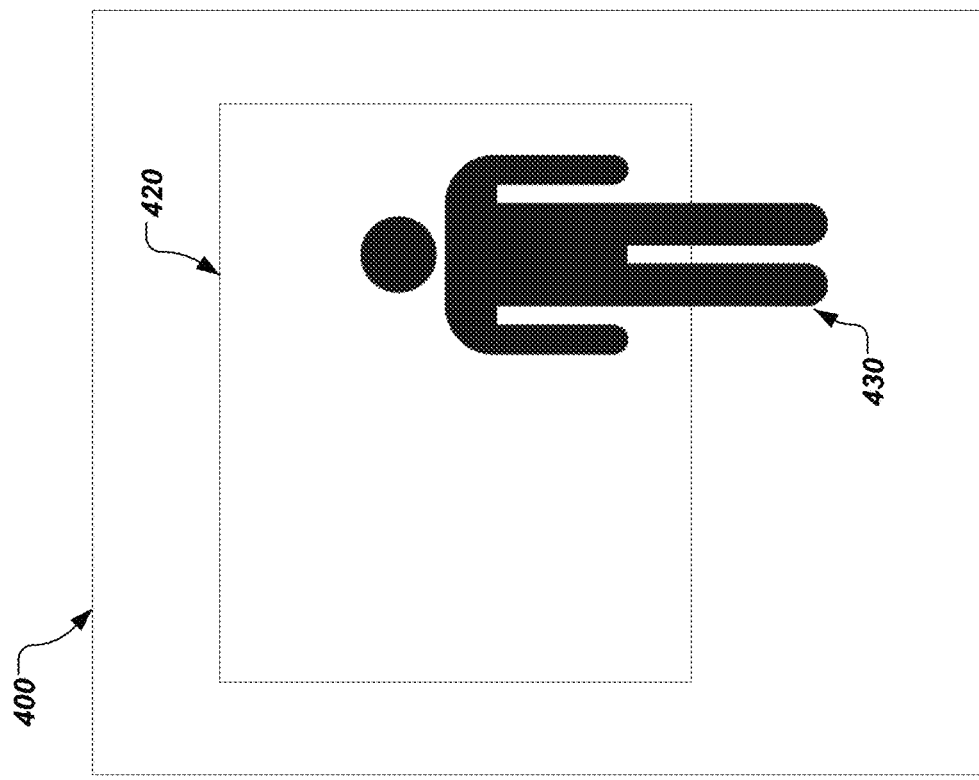
FIG. 4A presents a prior art green screen system before green-screen processing.

FIG. 4A shows a first example frame 400 before the frame is processed using the chroma keying technique. The first frame 400 depicts a green screen 420 and a human 430. FIG. 4B shows a second example frame 410. The second frame 410 is the output of a system that processes the first frame 400 using the chroma keying technique. The human 430 is not changed, as the human 430 does not depict any color in the color range that the system used in the chroma keying process. The green screen 420 of FIG. 4A was processed to generate a new screen 440 in FIG. 4B that depicts a different scene. The different scene depicted on the new screen 440 is the portion of a background image that is visible beneath the region of the screen 420 in FIG. 4A that was made transparent during the chroma keying process.

Similar to the color-based chroma keying technique is a shape-based chroma keying technique, where an image processor recognizes a particular shape in a camera frame instead of a particular color. When the shape is recognized, the portion of the camera frame that depicts the shape is rendered transparent, allowing separate background footage, computer graphics, or a static image to be inserted into the scene depicted in the camera frame.

Terms

The following is a list of terms used in the present application:

Memory—may include non-transitory computer readable media, including volatile memory, such as a random access memory (RAM) module, and non-volatile memory, such as a flash memory unit, a read-only memory (ROM), or a magnetic or optical disk drive, or any other type of memory unit or combination thereof. Memory is configured to store any software programs, operating system, drivers, and the like, that facilitate operation of display system, including software applications, rendering engine, spawning module, and touch module.

Display—may include the display surface or surfaces or display planes of any technically feasible display device or system type, including but not limited to the display surface of a light-emitting diode (LED) display, a digital light (DLP) or other projection displays, a liquid crystal display (LCD), optical light emitting diode display (OLED), laser-phosphor display (LPD) and/or a stereo 3D display all arranged as a single stand alone display, head mounted display or as a single or multi-screen tiled array of displays. Display sizes may range from smaller handheld or head mounted display devices to full wall displays, which may or may not include an array of display devices. The display may include a single camera within a mono display device or a dual camera for a stereo display device. The camera system is particularly envisioned on a portable display device, with a handheld, head mounted, or glasses device. The camera(s) would be located within the display device to peer out in the proximity of what the user of the display device might see; that is, facing the opposite direction of the display surface, Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a Memory.

Viewpoint—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one).

Position—the location or coordinates of an object (either virtual or real). For example, position may include x, y, and z coordinates within a defined space. The position may be relative or absolute, as desired. Position may also include yaw, pitch, and roll information, e.g., when defining the orientation of a viewpoint and/or object within a scene or the scene itself.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Graphical Processing Unit—refers to a component that may reside on a personal computer, workstation, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Projection—refers the display of a 3D object, or content, on a two dimensional (2D) display. Thus, a projection may be described as the mathematical function applied to objects within a virtual 3D scene to determine the virtual position, size, and orientation of the objects within a 3D space that may be defined by the size of the 3D stereoscopic display and the perspective of a user.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. First, Second, etc. —these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Exemplary System

Figure 5A:
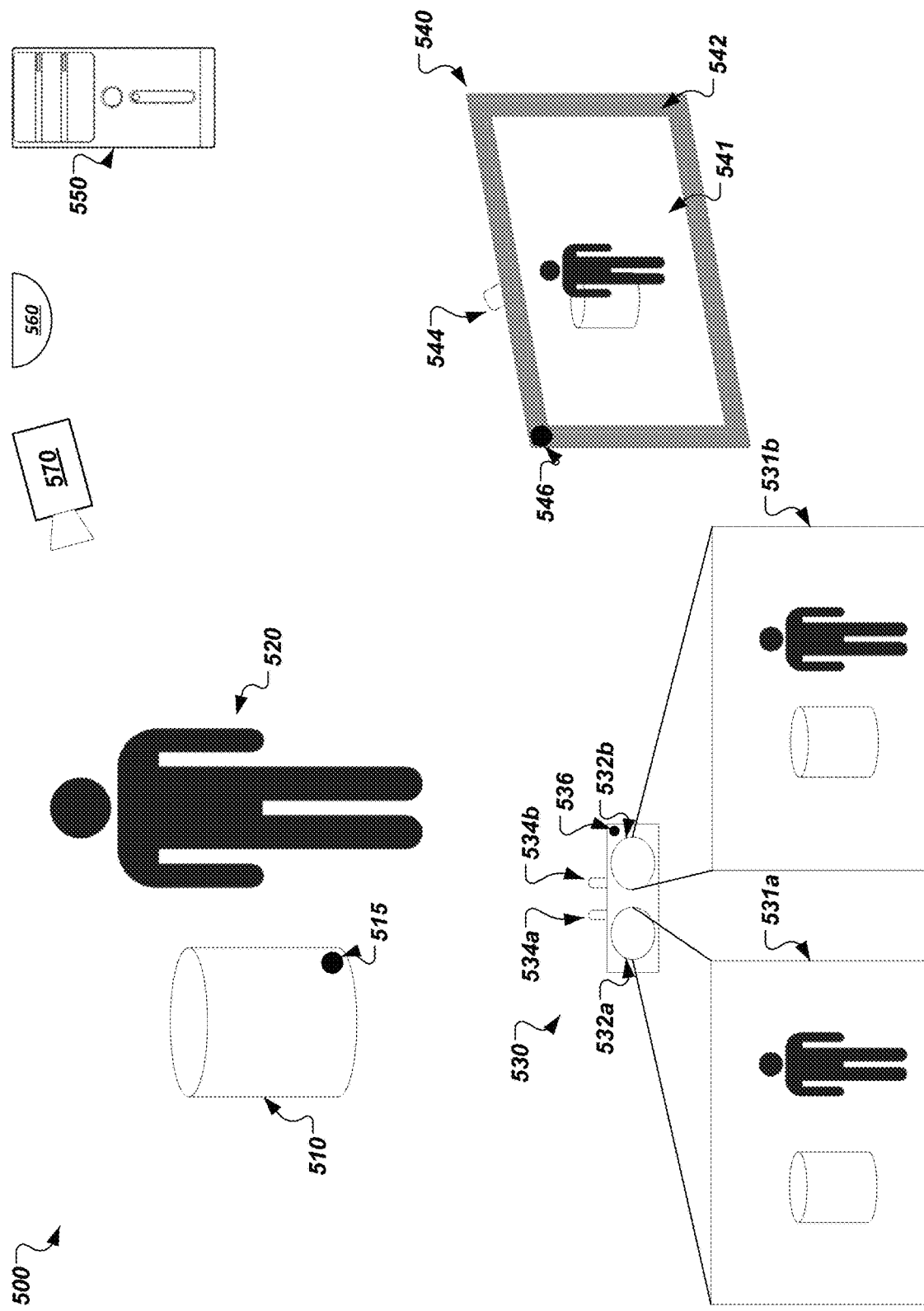
FIG. 5A presents an example scene before image processing.

FIG. 5A illustrates an exemplary system that may be configured to perform various embodiments described below.

FIG. 5A shows an example physical scene 500. The physical scene includes a "green-screen" region 510 and a non-green-screen object 520. Images of the physical scene 500 can be captured by a first device 530 and/or a second device 540. For example, the first device 530 and/or the second device 540 can capture a still image of the scene 500 or a video of the scene 500 compose of multiple frames. The first device 530 and/or the second device 540 can also capture a laser or sonic scan of the scene 500. A first initial image 531a and second initial image 531b, captured by the first device 530, and a third initial image 541, captured by the second device 540, depict the scene before the respective images are processed by a capture processing system 550 (in one implementation, an image processing system 550) to replace the regions of the image that identified the green-screen region 510 with a substitute rendering of a virtual object. In this case, the virtual object is a rendering of a three-dimensional dog.

As will be discussed in more detail below, the green-screen region 510 can be a physical object, or more generally a region of the scene 500. In this case, the green-screen region 510 is an identified physical object, and so below the green-screen region 510 will also be referred to as a green-screen object 510.

In some implementations, one device can capture images of the scene 500, and a different device can display the images. That is, the first device 530 can be composed of two different devices, one of which captures images and the other of which displays the images; the same is true of the second device 540.

The first device 530 and/or the second device 540 can send the respective initial captured images of scene 500 to the image processing system 550. In some implementations, the image processing system 550 can be on-site, e.g. in the same room as the physical scene 500 and the devices 530 and 540. In some other implementations, the image processing system 550 can be on the cloud, i.e., off-site. In some other implementations, the image processing system 550 can be a component of the first device 530 and/or the second device 540. In other words, each of the devices can include a version of the image processing system 550, so that the initial images of the physical scene 500 can be processed on-device.

The green-screen object 510 can be identified in images of the scene 500 by the image processing system 550.

For example, the surface of the green-screen object 510 can be a particular color, e.g. green or blue. In this case, the image processing system 550 can store a predetermined color range for each color channel of the image, e.g., for each of the RGB channels. For the image from each device, those pixels in the image having values within the ranges are selected by the image processing system 550 as belonging to the green-screen object 510. In some implementations, the image processing system 550 can then determine a volume in virtual three-dimensional space that is enclosed by the selected pixels. For example, the image processing system 550 can maintain a three-dimensional model of the scene 500 that includes coordinates for multiple objects in the scene 500. The image processing system 550 can use the size and position of the green-screen object 510 in the image to determine its volume in the maintained model. This process is described in more detail below in reference to FIG. 6. This volume then represents the three-dimensional volume over which the virtual object can be superimposed. In some other implementations, the image processing system 550 determines the two-dimensional size and shape of the green-screen object 510 in the image, and superimposes a depiction of the virtual object on or in replacement of the depiction of the green-screen objet 510 based on the two-dimensional size and shape.

As another example, the green-screen object 510 can have a particular shape that can be identified by the image processing system 550, e.g., a cube or a cylinder. In this case, the image processing system 550 can apply a machine vision algorithm, e.g., a machine vision algorithm developed through machine learning techniques, to identify the particular shape within the image. The virtual object can be superimposed over the identified shape according to a measured size of the shape in the image.

As another example, the green-screen object 510 can have a measured or predetermined spatial location, shape, size, orientation, and/or volume relative to each respective device 530 and 540. As a particular example, the green-screen object 510 can have a tracking component 515 that can be used to track the location of the green-screen object 510 that may be associated with a virtual coordinate system. In some implementations, the tracking component 515 can interact with a tracking base station 560, which is a master tracking device that allows the location of every object in the scene 500 that has a tracker component to be determined. In some implementations, the tracking base station 560 determines the location of each object; in some other implementations, each object determines its own location using the tracker base station 560. In either case, the location and orientation of the green-screen object 510 can be determined continuously in real-time. This process is discussed in more detail below. In this case, the image processing system 550 can maintain a three-dimensional model of the scene 500. The model can include the measured coordinates of the green-screen objects, e.g., a location and orientation of the green-screen objects, as well as a location and orientation of each of the capturing devices. The image processing system 550 can infer the portions of the captured images that depict the green-screen objects using the relative locations and orientations of the devices and green-screen objects. This process is discussed in more detail below in reference to FIG. 6.

In some implementations, the image processing system 550 renders and displays projections of a two-dimensional image in replacement to a particular two-dimensional surface of the green-screen object identified in a captured image, instead of replacing the depiction of the green-screen object with a depiction of a virtual object. In some such cases, the image processing system 550 can select a particular surface using one of the methods discussed above, e.g., one of the surfaces of the green-screen object 510 has a particular color or a particular shape. In some other such cases, the image processing system 550 can identify a green-screen object in the captured image using any of the methods discussed above, e.g., using a particular color or a particular shape. Then, the image processing system 550 can select one or more of the surfaces of the identified green-screen object using a set of one or more criteria. As a particular example, the image processing system 550 can identify a surface of the green-screen object that is closest to the device that captured the image, and project a two-dimensional image onto this surface.

In some implementations, the green-screen region 510 is not an object, but rather is defined to be a particular region of space in the scene 500, e.g., a three-dimensional portion of the scene 500 or a two-dimensional portion of a wall in the scene 500.

In some such implementations, the image processing system 550 can identify the particular region of the scene 500 in images of the scene 500. For example, the image processing system 550 can maintain a data defining the green-screen region 510 with respect to other objects in the scene 500, e.g., values defining the height, width, and height of a cubic region, as well as coordinates of the location and orientation of the region with respect to a wall in the scene or the non-green-screen object 520. Then, the system 550 can identify the other objects in a captured image of the scene 500, e.g., using a machine vision algorithm developed through machine learning techniques, and then identify the green-screen region in the captured image in relation to the identified other objects.

In some other such implementations, the image processing system 550 can identify the particular region of the scene 500 using a tracker component that is in the region. In this case, the system 550 can maintain a three-dimensional model of the scene 500. The model can include the dimensions of the green-screen region, e.g., a height, width, and height of a cubic region or a green-screen region shape, as well as the location and orientation of the region as measured by the tracker component; the model can also include a location and orientation of each of the capturing devices. The image processing system 550 can infer the portions of the captured images that depict the green-screen region using the relative determined locations and orientations of the devices and green-screen region. For example, the image processing system 550 can store data indicating a predetermined position of the boundaries of the green-screen region 550 relative to the determined location of the green-screen region. The image processing system can then determine the viewpoint of a capturing device relative to the measured location and orientation of the capturing device, and then infer the position of the green-screen region within the captured image of the scene.

The non-green-screen object 520 can be any captured physical object that is not identified as a green-screen object by the image processing system 550. For example, if the green-screen object 510 is identified according to a particular color, then the non-green-screen object 520 can have a different color than the green-screen object 510. As another example, if the green-screen object 510 is identified according to a particular shape, then the non-green-screen object 520 can have a different shape than the green-screen object 510. As another example, if the green-screen object 510 is identified according to a particular spatial shape, size, and/or location in a defined spatial region, then the non-green-screen object 520 can have a different shape, size, and/or location in a defined spatial region.

The first device 530 is a stereoscopic device, i.e., the first device 530 captures images of the scene 500 and displays the images to a user in stereo; that is, the captured images are captured from two distinct perspectives, which are generally the perspective of each of the user's eyes. The first device 530 includes a first display 532*a* and a second display 532*b*. For example, the first device 530 can present the first display 532*a* conveying the perspective captured from a the first capture device to the left eye of a user and the second display 532*b* conveying the perspective captured from a the second capture device to the right eye of a user, e.g., if the first device 530 is a head-mounted display. The space between the first display 532*a* and the second display 532*b* can correlate to the separation between the two eyes of the user reflected by the capture from the two close, yet distinct perspectives.

The first device 530 includes a first camera 534*a* and a second camera 534*b*. In some implementations, the first device 530 can have more than two cameras. The first camera 534*a* and the second camera 534*b* are separated by a distance on the first device 530 so that the two cameras can capture the scene 500 in stereo, correlating to the two close, but distinct perspectives. In some implementations, the separation between the first camera 534*a* and the second camera 534*b* can correlate to approximately the distance between the two eyes of the user. In some implementations, the two cameras and the two displays have the same horizontal relationship to each other, e.g., a line connecting the first display 532*a* and the second display 532*b* can be parallel to a line connecting the first camera 534*a* and the second camera 534*b*.

The first initial image 531*a* depicts the scene 500 as it was captured by the first camera 534*a*. The first initial image 531*a* would have been displayed to the left eye of the user on the first display 532*a* if the first initial image 531*a* were not to be processed by the image processing system 550. The second initial image 531*b* depicts the scene 500 as it was captured by the second camera 534*b*. The second initial image 531*b* would have been displayed to the right eye of the user on the second display 532*b* if the second initial image 531*b* were not to be processed by the image processing system 550.

The first device 530 can also include at tracker component 536, where the tracker component 536 that includes multiple photosensors. In some implementations, the tracking base station 560 can determine the location of the first device 530 by interacting with the tracker component 536. In some other implementations, the first tracking component 536 can determine its own location by interacting with the tracking base station 560. In either case, the location and orientation of the first device 530 can be determined continuously in real-time. This process is described in more detail below.

As a particular example, the first device 530 can be Skyzone SKY02S V+™ 3D virtual reality glasses with a stereo front facing camera and a stereo rendering eyewear display. As another example, the first device 530 can be a Rembrandt 3D™ tablet with a stereo front-facing camera and a stereo rendering display. In this case, the first display 532*a* and the second display 532*b* are the same display.

The second device 540 is a handheld device with a single display 542, i.e., the display 542 is monoscopic instead of stereoscopic. The second device 540 includes a camera 544 and a tracking component 546 that perform similar functions to the cameras 534*a* and 534*b* and the tracking component 536 of the first device 530, respectively.

The third initial image 541 depicts the scene 500 as it was captured by the camera 544. The third initial image 541 would have been displayed on the display 542 if the third initial image 541 were not processed by the image processing system 550.

For example, the second device 540 can be a smartphone or tablet running the Android, Windows, or iOS operations system that includes a display on one side and one or more cameras on the other side.

While the first device 530 both captures and displays images stereoscopically, and the second device 540 both captures and displays images monoscopically, in general a stereoscopic capture device can have a monoscopic display and a monoscopic capture device can have a stereoscopic display.

The tracking base station 560 allows the location and orientation of each object that has a respective tracking component to be tracked; e.g., the first device 530, the second device 540, and optionally the green-screen object 510 can be tracked using the tracking base station 560. The tracking component of a given object can have multiple photosensors that are separated by some distance.

In some implementations, the tracking base station 560 emits a radiation signal, e.g., a wavelength of light or send. Each photosensor in the tracking component of a given object can reflect the radiation signal back to the tracking base station 560. The tracking base station 560 can use the multiple returned radiation signals to determine the location and orientation of the given object. For example, the tracking base station can determine the 6 degrees of freedom of the object, e.g., the x-position, y-position, z-position, pitch, yaw, and roll of the object according to a coordinate system. The tracking base station can repeatedly perform this process in order to determine the location and orientation of the object continuously in real-time.

In some other implementations, the tracking base station 560 can emit a first radiation signal and a second radiation signal concurrently, e.g., if the tracking base station 560 includes two emitters that are physically separated by a distance. Each photosensor in the tracking component of a given object can detect the first radiation signal and the second radiation signal at respective detection times, and the tracking component can use the respective detection times of each of the photosensors to determine the position and orientation of the given object. As a particular example, the tracking base station 560 can be an HTC Vive Lighthouse™.

In some other implementations, the tracking base station 560 can include multiple cameras capturing images of the scene 500. The tracking base station 560 can perform object recognition on the captured images, and infer the geometry of the respective tracked objects that are recognized in the captured images.

Whether the position and orientation of each object is determined by the tracking base station 560 or by the object itself, the determined position and orientation can be provided to the image processing system 550, along with the first initial image 531*a*, the second initial image 531*b*, and the third initial image 541 of the scene 500.

In some implementations, a camera 570 can capture context images of the physical scene 500 and send the context images to the image processing system 550. The context images can be used by the image processing system 550 when replacing the image region of green-screen object 510 in a captured image with the virtual object rendering to generate a processed image. The processed image that depicts the green-screen object and/or region replaced with a virtual object and/or virtual scene is also sometimes called a "composited" image. In some cases, the virtual object projected rendering may not completely encompass the green-screen object 510 region in the initial image. That is, in some implementation, when the green-screen object 510 is replaced by the virtual object, portions of the scene 500 that are behind the green-screen object 510 relative to the device may be exposed, and should be rendered in the processed image; that is, the virtual object 510 or scene does not completely fill the green-screen object region. As a particular example, the system might replace a spherical green-screen object with a torus virtual object; in this case, the system needs to render the center of the torus with an image of what is behind the spherical green-screen object. In these cases, the context images captured by the camera 570 can provide information about what is behind the green-screen object 510, so that the exposed regions can be rendered realistically in the processed image.

The image processing system 550 receives the location and orientation of the first device 530 and the second device 540, as well as the initial images captured by the first device 530 and the second device 540, and optionally the context images captured by the camera 570. The image processing system 550 processes the initial images to replace the green-screen object 510 with the replacement projection rendering of the dog from a perspective corresponding to the perspective of each capture device. In particular, the image processing system 550 processes the first initial image 531*a* to generate a first processed image 538*a*, processes the second initial image 531*b* to generate a second processed image 538*b*, and processes the third initial image 541 to generate a third processed image 548. This process is explained in more detail below in reference to FIG. 6.

Figure 5B:
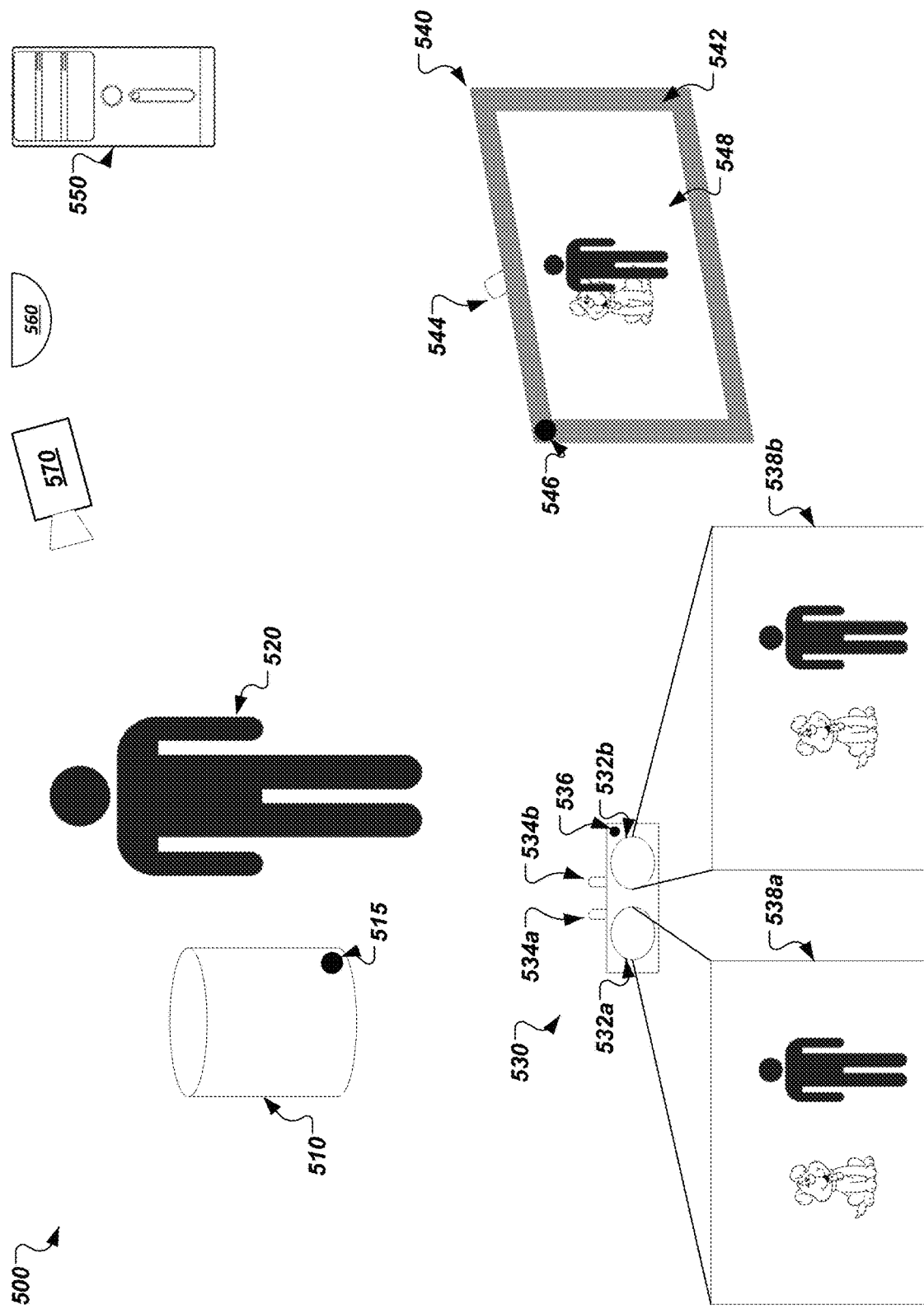
FIG. 5B presents the example scene after image processing.

FIG. 5B shows the same scene 500 that was shown in FIG. 5A, after the image processing system 550 has generated the three processed images and sent each processed image to the respective device: the first processed image 538*a* is displayed for the user on the first display 532*a* of the first device 530, the second processed image 538*b* is displayed for the user on the second display 532*b* of the first device 530, and the third processed image 548 is displayed for the user on the display 542 of the second device 540.

In each of the processed images, the green-screen object 510 has been replaced by a rendering of the dog. In particular, the image processing system 550 used a three-dimensional virtual object characterizing the dog to render each processed image according to the perspective position and orientation of the camera that captured the respective initial image. That is, the first processed image 538*a* renders the dog projection from the perspective point of view of the first camera 534*a* of the first device, i.e., from the left side of the dog, with the non-green-screen object 520 to the right of the dog. Similarly, the third processed image 548 renders the dog from the point of view of the camera 544 of the second device 540, i.e., from the right side of the dog, partially obscured by the non-green-screen object 520. In particular, the third processed image 548 shows parts of the rendered dog, e.g. the right side of the dog, that the first processed image 538*a* does not show, and vice versa.

The virtual object and/or virtual scene is constrained to be within the green-screen region, as depicted in each processed image. In other words, the depiction of the virtual object and/or virtual scene in a processed image cannot extend beyond the portion of the respective initial image that depicted the green-screen object, but the virtual object/scene projection is constrained to only render within the determined green-screen region and may not extend beyond that boundary.

The processed image can only extend beyond the portion of the respective initial image that depicted the green-screen object, if the definition of the green-screen region is defined as a regional function of the identified green-screen region. In that condition the green-screen region is expanded or contracted to that defined regional function of the identified green-screen region as predetermined by a user or set as a default within the image processing system. For example, the green-screen region can be defined as the region of space that extends outward in all directions from the green-screen object 510 a distance equal to or approximately equal to 10% of the size of the green-screen region. The determination of the green-screen region as determined by the regional function is independent of the virtual object or virtual scene information.

The devices 530 and 540 and the image processing system 550 can repeatedly perform this process in order to generate processed images for each frame of a video, so that the user can view the processed images as if they were being captured in real-time from the physical scene 500. In particular, if the user moves the device around the green-screen object 510, the image processing system 550 will continuously generate images that depict the virtual dog from different angles. Similarly, if the physical green-screen object 510 is moved within the scene 500, e.g., if the green-screen object 510 is moved further away from the non-green-screen object 520, then the image processing system 550 will re-determine the correct position and orientation of the virtual object within each of the processed images accordingly.

Exemplary Process

Figure 6:
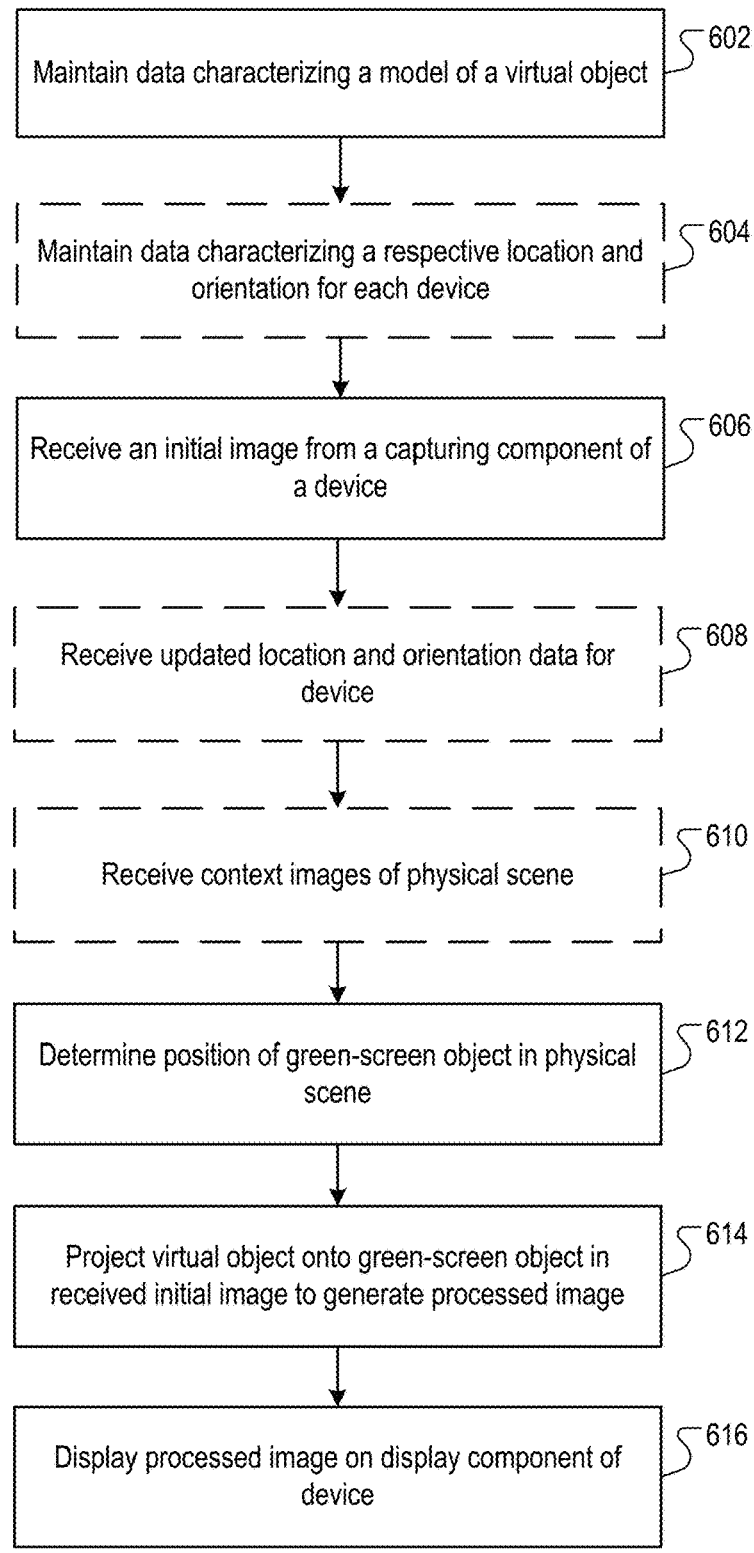
FIG. 6 is a flow diagram of an example process for perspective-based green screening.

FIG. 6 is a flow diagram of an example process 600 for perspective-based green screening. The process 600 allows a system to process an image containing a green-screen object to replace the green-screen object with a depiction of a virtual object. For convenience, the process 600 will be described as being performed by a system of one or more computers located in one or more locations. For example, an image processing system, e.g., the image-processing system 550 of FIGS. 5A and 5B, appropriately programmed in accordance with this specification, can perform the process 600. As another example, a stereoscopic or monoscopic device, e.g., the first device 530 or the second device 540 of FIGS. 5A and 5B, appropriately programmed in accordance with this specification, can perform the process 600. In some implementations, a subset of steps of the process 600 can be performed by an image-processing system that is separate from a stereoscopic or monoscopic device, and the remaining steps of the process 600 can be performed on-device by the respective stereoscopic or monoscopic device.

The system maintains a data characterizing a model of the virtual object (step 602). The model identifies a shape and size of the virtual object. The model can have associated data that identifies a position and orientation of the virtual object relative to a real-world physical scene, where the real-world physical scene is defined by a three-dimensional coordinate system. The associated data can have six dimensions in total: three dimensions defining the position of the object and three dimensions defining the orientation of the object (e.g., pitch, yaw, and roll), where all dimensions are with respect to the three-dimensional coordinate system of the real-world physical scene.

Optionally, the system can maintain data characterizing the position of one or more devices in the real-world physical scene (step 604). The devices can be monoscopic or stereoscopic devices, and can include a capturing component and a displaying component; i.e., the devices can be configured to capture and display images of the real-world physical scene. For each tracked device, the system can maintain information identifying six degrees of freedom of the device in the scene, e.g., three dimensions defining the position of the device and three dimensions defining the orientation of the device. The system can maintain a time series of this information, where each element in the time series characterizes the device at a different point in time. In some implementations, the tracking information for a given device can be shared with other devices.

In some implementations, the system can also maintain data characterizing the location and orientation of one or more green screen objects. In some such implementations, the system can track the location of a green-screen object using a tracking component of the green-screen object, instead of identifying the green-screen object according to its color or shape.

The system receives an initial image (step 606). The initial image was captured by a capturing component of one of the devices. In some implementations, the system can receive two or more initial images captured by a capturing component of a stereoscopic device, wherein the two or more initial images depict the real-world physical scene at the same time point from slightly different angles.

Optionally, the system can receive position data characterizing the one or more devices and/or one or more green-screen objects (step 608). The system can use the new position data to update the maintained models characterizing the position of the devices and/or green-screen objects.

Optionally, the system can receive one or more context images of the real-world physical scene (step 610). The context images can be captured by a camera, e.g., the camera 570 in FIGS. 5A and 5B, and can be used by the system to replace the green-screen object with the virtual object in the received initial images. The context images can provide information about what is behind the green-screen objects relative to the device that captured the initial image.

The system determines a position of the green-screen object in the physical scene (step 612). The position of the green-screen object can include coordinates defining a location of the green-screen object in the scene. The system can also determine associated data that identifies an orientation and size of the green-screen object in the initial image, relative to a coordinate system of the scene. This model of the green-screen object can be in the same coordinate system as the model of the virtual object.

In some implementations, the system can determine the position of the green-screen object in the physical scene using multiple images of the physical scene taken by the same device across different time points, using a motion parallax algorithm. That is, the system can detect the green-screen object for each image, where the green-screen object is depicted from a slightly different angle at each time point. Then, the system can infer the position of the green-screen object in the physical scene according to a coordinate system using a motion parallax algorithm, e.g., using one of the algorithms described in A Survey of Motion-Parallax-Based 3-D Reconstruction Algorithms, Lu et al., DOI: 10.1109/TSMCC.2004.829300.

In some such implementations, the system can identify the green-screen object in the initial image by identifying pixels of a particular color, e.g., green or blue.

In some other such implementations, the system can identify the green-screen object in the initial image by identifying a particular shape in the initial image, e.g., using computer vision techniques. In some other implementations, the system can determine the location and heading of the green-screen object relative to the device in the physical scene using the maintained position data of the green-screen object and devices (see step 604). In these situations, the system recognizes where within the image frame the green-screen region is and correlates that to the corresponding pixels of the image frame. Only these pixels then get replaced with the appropriate projected rendered virtual scene or objects. The replaced pixels together with the original image pixels comprise the new rendered image to be displayed on the one or more mono or stereo displays.

In the implementations where the system receives two or more stereoscopic initial images, the system can process the initial images together to determine the position of the green-screen object. The system can use differences between the images, as well as the distance between the respective cameras that captured the images, e.g., the distance between the first camera 534*a* and the second camera 534*b* in FIGS. 5A and 5B, to geometrically determine the position of the green-screen objects in the physical scene. Using two stereoscopic images allows the system to determine the projection; that is, the location and heading of the green-screen object more precisely than if the system only had access to a single monoscopic initial image; in particular, the system in an implementation is able to determine the depth of the green-screen object and the distance of the green-screen object from the device more precisely.

After determining the position of the green-screen object, the system can update the maintained model characterizing the position of the green-screen object.

The system projects the virtual object to be rendered over green-screen object in the received initial image to generate a processed image (step 614). Using the geometry determined in step 612, the system can replace the green-screen object in the initial image with the virtual object so that the virtual object in the generated processed image has the correct position, orientation, and size.

For example, the system can correlate each of the dimensions of the model and the associated data of the virtual object with a corresponding dimension of the physical green-screen object, so that a particular position and/or orientation of the green-screen object in the physical scene can be mapped one-to-one to a particular position and/or orientation of the virtual object. As a particular example, the model of the virtual object can define a particular direction as the "forward" direction; similarly, the system can determine a "forward" direction of the identified green-screen, e.g., according to the shape of the object from the perspective of the captured image. Then, the system can transform the model, using the associated data, so that the two "forward" directions are aligned.

The virtual object is constrained to be strictly within the green-screen object in the model of the scene, and therefore the displayed pixels that were the pixels of the green-screen object are the pixels that are replaced with the rendered virtual object of scene. That is, the depiction of the virtual object in a processed image cannot extend beyond the portions of the initial image that depicted the green-screen object. In some implementations, the model of the virtual object can be scaled to fit within the model of the green-screen object, i.e., the dimensions of the model of the virtual object that define the size of the virtual object are decreased, to scale, until the model of the virtual object is strictly inside the model of the green-screen object in the common coordinate system. In some other implementations, the portions of the model of the virtual object that extend beyond the model of the green-screen objet can be clipped, so that the clipped model of the virtual object fits strictly inside the model of the green-screen object.

In the implementations where the system receives two or more stereoscopic initial images, the system can generate two processed images where the projection based on the perspective or position of the virtual object is slightly different, according to the distance between the respective cameras that captured the initial images.

The system displays the processed image on the display component of the device that captured the initial image (step 616). In implementations where the system received two stereoscopic initial images, the system can display each processed image on the respective eye's display, or display both images on a single display; e.g., the system can display both images consecutively on a time-sequential stereoscopic display.

A computer generated background image replacing an identified green screen region, where the green screen region is within a camera captured display window, where the computer generated background image is from a 3D scene model whose 3D rendering may be positioned/oriented in space to the mapped identified green screen region, thereby replacing the green screen region with the rendering being a projection rendering, based on the detected position/orientation to a user's capture/viewing device which renders the scene model, and where the capture mechanism is a camera (or other capture mechanism) that captures the physical space before the capture/viewing device, where the 3D scene model is mapped to in position/orientation to the physical space captured by the capture mechanism.

It should be noted that the above-described embodiments are exemplary only, and are not intended to limit the invention to any particular form, function, or appearance. Moreover, in further embodiments, any of the above features may be used in any combinations desired. In other words, any features disclosed above with respect to one method or system may be incorporated or implemented in embodiments of any of the other methods or systems.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method comprising:
   receiving a stereoscopic video image of a physical scene captured by a camera, the physical scene comprising an object having a tracking component;
   storing data providing a model defining (i) dimensions of a three-dimensional green-screen region and (ii) a location and/or orientation of the three-dimensional green-screen region relative to the object;
   receiving, from the tracking component, data identifying a location of the object;
   identifying a three-dimensional region of space in the physical scene for the three-dimensional green-screen region based on (i) the location received from the tracking component and (ii) the data defining dimensions of the three-dimensional green-screen region and the location and/or orientation of the three-dimensional green-screen region relative to the object;
   identifying an eyepoint pair in the physical scene;
   identifying, for each eyepoint of the eyepoint pair, a position and/or orientation of the three-dimensional green-screen region relative to the eyepoint; and
   rendering a modified stereoscopic video image onto a display surface in which the three-dimensional green-screen region is replaced with a depiction of a virtual three-dimensional object, the rendering comprising:
      obtaining a three-dimensional model of the virtual three-dimensional object,
      determining a three-dimensional boundary of the three-dimensional green-screen region,
      determining, for each eyepoint of the eyepoint pair, a respective different perspective of the virtual three-dimensional object based on (i) the three-dimensional model of the virtual three-dimensional object and (ii) the position and/or orientation of the three-dimensional green-screen region relative to the eyepoint, and
      for each eyepoint of the eyepoint pair, performing a projection rendering of the three-dimensional model of the virtual three-dimensional object based on the determined perspective of the eyepoint such that the depiction of the virtual three-dimensional object is constrained to be within the determined three-dimensional boundary of the three-dimensional green-screen region.

2. The method of claim 1, wherein:
   the method further comprises storing data providing a scene model that is a three-dimensional model of the physical scene, and
   identifying the three-dimensional region of space in the physical scene for the three-dimensional green-screen region comprises:
      updating the scene model using the location received from the tracking component, and
      identifying the three-dimensional region of space in the physical scene based on the updated scene model.

3. The method of claim 1, wherein, for each eyepoint of the eyepoint pair, performing a projection rendering of the three-dimensional model of the virtual three-dimensional object comprises:
   identifying a portion of the stereoscopic video image that depicts the three-dimensional green-screen region based on the position and/or orientation of the three-dimensional green-screen region relative to the eyepoint; and
   performing the projection rendering onto the identified portion of the stereoscopic video image based on the determined perspective of the eyepoint.

4. The method of claim 1, wherein:
   the method further comprises receiving a context image of the physical scene captured by a second camera, and
   rendering the modified stereoscopic video image comprises rendering, using the context image, a sub-region of the three-dimensional green-screen region that (i) is occluded in the stereoscopic video image from the perspective of at least one eyepoint and (ii) is not occluded in the modified stereoscopic image from the perspective of the at least one eyepoint.

5. The method of claim 1, wherein the model defines the dimensions of the three-dimensional green-screen region according to a regional function of the object.

6. The method of claim 5, wherein the model defines the three-dimensional green-screen region to be the three-dimensional region of space extending outward in all directions from the object.

7. The method of claim 1, wherein identifying, for each eyepoint of the eyepoint pair, a position and/or orientation of the three-dimensional green-screen region relative to the eyepoint comprises:
receiving, from a second tracking component, data identifying a location of the eyepoint and/or a location of a display device that is configured to display the modified stereoscopic video image; and
identifying the position and/or orientation of the three-dimensional green-screen region relative to the eyepoint based on (i) the location of the object received from the tracking component, (ii) the data defining dimensions of the three-dimensional green-screen region and the location and/or orientation of the three-dimensional green-screen region relative to the object, and (iii) the location of the eyepoint and/or the location of the display device received from the second tracking component.

8. A computer program product comprising a non-transitory computer readable medium having instructions for causing one or more processors to:
receive a stereoscopic video image of a physical scene captured by a camera, the physical scene comprising an object having a tracking component;
store data providing a model defining (i) dimensions of a three-dimensional green-screen region and (ii) a location and/or orientation of the three-dimensional green-screen region relative to the object;
receive, from the tracking component, data identifying a location of the object;
identify a three-dimensional region of space in the physical scene for the three-dimensional green-screen region based on (i) the location received from the tracking component and (ii) the data defining dimensions of the three-dimensional green-screen region and the location and/or orientation of the three-dimensional green-screen region relative to the object;
identify an eyepoint pair in the physical scene;
identify, for each eyepoint of the eyepoint pair, a position and/or orientation of the three-dimensional green-screen region relative to the eyepoint; and
render a modified stereoscopic video image onto a display surface in which the three-dimensional green-screen region is replaced with a depiction of a virtual three-dimensional object, the instructions to render comprising instructions to:
obtain a three-dimensional model of the virtual three-dimensional object,
determine a three-dimensional boundary of the three-dimensional green-screen region,
determine, for each eyepoint of the eyepoint pair, a respective different perspective of the virtual three-dimensional object based on (i) the three-dimensional model of the virtual three-dimensional object and (ii) the position and/or orientation of the three-dimensional green-screen region relative to the eyepoint, and
for each eyepoint of the eyepoint pair, perform a projection rendering of the three-dimensional model of the virtual three-dimensional object based on the determined perspective of the eyepoint such that the depiction of the virtual three-dimensional object is constrained to be within the determined three-dimensional boundary of the three-dimensional green-screen region.

9. The computer program product of claim 8, wherein:
the non-transitory computer readable medium further comprises instructions for causing the one or more processors to store data providing a scene model that is a three-dimensional model of the physical scene, and
the instructions to identify the three-dimensional region of space in the physical scene for the three-dimensional green-screen region comprise instructions to:
update the scene model using the location received from the tracking component, and
identify the three-dimensional region of space in the physical scene based on the updated scene model.

10. The computer program product of claim 8, wherein, for each eyepoint of the eyepoint pair, the instructions to perform a projection rendering of the three-dimensional model of the virtual three-dimensional object comprise instructions to:
identify a portion of the stereoscopic video image that depicts the three-dimensional green-screen region based on the position and/or orientation of the three-dimensional green-screen region relative to the eyepoint; and
perform the projection rendering onto the identified portion of the stereoscopic video image based on the determined perspective of the eyepoint.

11. The computer program product of claim 8, wherein:
the non-transitory computer readable medium further comprises instructions for causing the one or more processors to receive a context image of the physical scene captured by a second camera, and
the instructions to render the modified stereoscopic video image comprise instructions to render, using the context image, a sub-region of the three-dimensional green-screen region that (i) is occluded in the stereoscopic video image from the perspective of at least one eyepoint and (ii) is not occluded in the modified stereoscopic image from the perspective of the at least one eyepoint.

12. The computer program product of claim 8, wherein the model defines the dimensions of the three-dimensional green-screen region according to a regional function of the object.

13. The computer program product of claim 12, wherein the model defines the three-dimensional green-screen region to be the three-dimensional region of space extending outward in all directions from the object.

14. The computer program product of claim 8, wherein the instructions to identify, for each eyepoint of the eyepoint pair, a position and/or orientation of the three-dimensional green-screen region relative to the eyepoint comprise instructions to:
receive, from a second tracking component, data identifying a location of the eyepoint and/or a location of a display device that is configured to display the modified stereoscopic video image; and
identify the position and/or orientation of the three-dimensional green-screen region relative to the eyepoint based on (i) the location of the object received from the tracking component, (ii) the data defining dimensions of the three-dimensional green-screen region and the location and/or orientation of the three-dimensional green-screen region relative to the object, and (iii) the location of the eyepoint and/or the location of the display device received from the second tracking component.

15. A system comprising one or more computers and one or more storage devices storing instructions that are operable, when executed by the one or more computers, to cause the one or more computers to perform operations comprising:

receiving a stereoscopic video image of a physical scene captured by a camera, the physical scene comprising an object having a tracking component;

storing data providing a model defining (i) dimensions of a three-dimensional green-screen region and (ii) a location and/or orientation of the three-dimensional green-screen region relative to the object;

receiving, from the tracking component, data identifying a location of the object;

identifying a three-dimensional region of space in the physical scene for the three-dimensional green-screen region based on (i) the location received from the tracking component and (ii) the data defining dimensions of the three-dimensional green-screen region and the location and/or orientation of the three-dimensional green-screen region relative to the object;

identifying an eyepoint pair in the physical scene;

identifying, for each eyepoint of the eyepoint pair, a position and/or orientation of the three-dimensional green-screen region relative to the eyepoint; and rendering a modified stereoscopic video image onto a display surface in which the three-dimensional green-screen region is replaced with a depiction of a virtual three-dimensional object, the rendering comprising:

obtaining a three-dimensional model of the virtual three-dimensional object, determining a three-dimensional boundary of the three-dimensional green-screen region, determining, for each eyepoint of the eyepoint pair, a respective different perspective of the virtual three-dimensional object based on (i) the three-dimensional model of the virtual three-dimensional object and (ii) the position and/or orientation of the three-dimensional green-screen region relative to the eyepoint, and for each eyepoint of the eyepoint pair, performing a projection rendering of the three-dimensional model of the virtual three-dimensional object based on the determined perspective of the eyepoint such that the depiction of the virtual three-dimensional object is constrained to be within the determined three-dimensional boundary of the three-dimensional green-screen region.

16. The system of claim 15, wherein:

the operations further comprise storing data providing a scene model that is a three-dimensional model of the physical scene, and identifying the three-dimensional region of space in the physical scene for the three-dimensional green-screen region comprises:

updating the scene model using the location received from the tracking component, and identifying the three-dimensional region of space in the physical scene based on the updated scene model.

17. The system of claim 15, wherein, for each eyepoint of the eyepoint pair, performing a projection rendering of the three-dimensional model of the virtual three-dimensional object comprises:

identifying a portion of the stereoscopic video image that depicts the three-dimensional green-screen region based on the position and/or orientation of the three-dimensional green-screen region relative to the eyepoint; and performing the projection rendering onto the identified portion of the stereoscopic video image based on the determined perspective of the eyepoint.

18. The system of claim 15, wherein:

the operations further comprise receiving a context image of the physical scene captured by a second camera, and rendering the modified stereoscopic video image comprises rendering, using the context image, a sub-region of the three-dimensional green-screen region that (i) is occluded in the stereoscopic video image from the perspective of at least one eyepoint and (ii) is not occluded in the modified stereoscopic image from the perspective of the at least one eyepoint.

19. The system of claim 15, wherein the model defines the dimensions of the three-dimensional green-screen region according to a regional function of the object.

20. The system of claim 19, wherein the model defines the three-dimensional green-screen region to be the three-dimensional region of space extending outward in all directions from the object.

21. The system of claim 15, wherein identifying, for each eyepoint of the eyepoint pair, a position and/or orientation of the three-dimensional green-screen region relative to the eyepoint comprises:

receiving, from a second tracking component, data identifying a location of the eyepoint and/or a location of a display device that is configured to display the modified stereoscopic video image; and identifying the position and/or orientation of the three-dimensional green-screen region relative to the eyepoint based on (i) the location of the object received from the tracking component, (ii) the data defining dimensions of the three-dimensional green-screen region and the location and/or orientation of the three-dimensional green-screen region relative to the object, and (iii) the location of the eyepoint and/or the location of the display device received from the second tracking component.

* * * * *